United States Patent [19]

Damman

[11] 4,126,942

[45] Nov. 28, 1978

[54] APPARATUS FOR DETECTING LATERAL IRREGULARITIES OF THE RIM OF A WIRE SPOKE WHEEL

[75] Inventor: Cornelis C. Damman, Diemen, Netherlands

[73] Assignee: Holland Mechanics B.V., Diemen, Netherlands

[21] Appl. No.: 834,767

[22] Filed: Sep. 19, 1977

[30] Foreign Application Priority Data

Sep. 17, 1976 [NL] Netherlands .......................... 7610389

[51] Int. Cl.² ............................................. G01B 5/255
[52] U.S. Cl. ............................... 33/203.12; 33/203.16
[58] Field of Search ................. 33/174 Q, 203, 203.12, 33/203.13, 203.16, 203.19

[56] References Cited

U.S. PATENT DOCUMENTS 2,537,616  1/1951  Avenia ............................... 33/203.16

FOREIGN PATENT DOCUMENTS 931,948  11/1947  France ................................... 33/203.16
27,612  9/1932  Netherlands .......................... 33/203.16
281,996  7/1928  United Kingdom .................. 33/203.16
865,451  4/1961  United Kingdom .................. 33/203.16

Primary Examiner—Richard R. Stearns
Attorney, Agent, or Firm—Lane, Aitken, Dunner & Ziems

[57] ABSTRACT

An apparatus for detecting lateral irregularities of the rim of a wire spoke wheel, in particular for use in a machine for centering such spoke wheels of the type having a wheel spindle, a hub rotatable on the spindle, a wheel rim and a plurality of adjustable spokes extending between the hub and the rim. The apparatus comprises spindle holding means for receiving and fixedly holding the wheel spindle and mounted in the frame of the apparatus for free sliding movement in the axial direction of the wheel spindle, and two oppositely arranged rim followers adapted to engage the wheel rim on both sides thereof at one location of the wheel circumference so as to hold the rim in a fixed lateral position at this location while allowing the wheel rim to be rotated about the spindle, and detecting means for detecting lateral displacements of the spindle holding means when the wheel is so rotated.

8 Claims, 2 Drawing Figures

APPARATUS FOR DETECTING LATERAL IRREGULARITIES OF THE RIM OF A WIRE SPOKE WHEEL

BACKGROUND OF THE INVENTION

The invention relates to an apparatus for detecting lateral irregularities of the rim of a wire spoke wheel, in particular for use in a machine for centering such spoke wheels.

Wire spoke wheels, such as bicycle wheels, generally include a wheel spindle, a hub rotatable on the spindle between two retaining nuts on this spindle, a wheel rim and a plurality of spokes extending between the hub and the rim and secured to the latter by adjustable nipples screwed on the threaded outer ends of the spokes. When building such spoke wheels the spokes threaded in a predetermined manner through holes in the hub and in the rim must be properly tensioned by proper adjustment of the nipples to make the rim circular and concentric with the spindle, that is to correct radial errors, and also to make the rim flat, that is to correct lateral irregularities or so-called flat errors.

Although this truing or centering of wire spoke wheels is still in many cases carried out by hand, machines have been developed for automatically centering spoke wheels. One such machine is disclosed in the Netherlands Patent Application 74.12490 and comprises spindle holding means adapted to receive and fixedly hold the spindle of the wheel to be centered in a fixed radial and axial position while allowing the wheel to be rotated. This machine further comprises means for detecting radial errors of the rim, means for detecting flat errors of the rim, drive means for rotating the wheel step by step past these detecting means, one or more driven nipple turning units for turning the spoke nipples in the one or the other direction, and control means for actuating these nipple turning units in response to a detected radial error and/or flat error of the spoke wheel to be centered. The means for detecting flat errors of the wheel rim comprises two oppositely arranged rim followers or rollers engaging the wheel rim on both sides thereof at one location of its circumference which rim followers are carried by a support which is mounted for free lateral movement in the machine frame whereby on turning the wheel this support is laterally displaced in response to flat errors occurring in the wheel rim, which displacement are a measure of such errors with respect to a radial plane of reference through the center of the wheel hub. The support further carries the nipple turning units together with the drive means therefor. This spoke wheel centering machine has the disadvantage that if at the location of a detected flat error the nipple turning units are moved to engage the spoke nipples adjacent this location to correct the error, it is unavoidable that shocks and mass forces occur having a lateral component which may cause a small lateral deformation and displacement of the wheel rim. This interferes with a correct measurement of the flat error and thus with the correction thereof.

SUMMARY OF THE INVENTION

The invention has for its main object to provide an apparatus of the kind described which allows an accurate measurement of lateral irregularities of the rim of a spoke wheel while fixedly supporting the rim against lateral movement at the point of measurement.

A further object of the invention is to provide an apparatus of the kind described for use in a machine for centering spoke wheels to obviate the above-mentioned disadvantages.

In the apparatus of the invention the wheel spindle holding means are mounted in the frame of the apparatus for free longitudinal sliding movement in the axial direction of the spindle held therein while wheel rim retaining means are provided comprising two oppositely arranged rim follower means adapted to engage the wheel rim on both sides thereof at one point of its circumference so as to hold the rim in a fixed lateral position at said point while allowing the wheel to be rotated about its spindle. The follower means thus determine as fixed plane of reference extending midway therebetween perpendicular to the direction of movement of the spindle holding means. The lateral irregularities of the wheel rim are detected by measuring the lateral position of the axially movable spindle holding means with respect to this plane of reference.

Since thus the wheel rim is fixedly held against lateral displacement at the location where the flat error is to be measured, the application of forces adjacent this location by a manual nipple adjusting tool or an automatic nipple turning unit cannot influence the flat error occurring at this location of the rim. The axial position of the wheel spindle and thus of the spindle holding means with respect to the plane of reference is not influenced by the application of such a nipple adjusting tool and provides a correct indication of the flat error so as to allow a proper correction of this error.

BRIEF DESCRIPTION OF THE DRAWINGS

The present invention will be more readily understood and further objects and advantages thereof will be more apparent when read in conjunction with the accompanying drawings, in which

Referring to FIG. 1 of the drawings, the apparatus there shown has a vertical frame comprising side support beams 1 and an upper cross-beam 2 and a lower cross-beam 2' which frame has a vertical plane of symmetry indicated by 3 which will be called the plane of reference. The frame 1, 2, 2' supports a wheel spindle holding means generally indicated by 4 and a wheel rim retaining means generally indicated by 5 which cooperate in determining flat errors of a wire spoke wheel, such as the bicycle wheel 6, removably mounted in the apparatus. The spoke wheel 6 is of conventional design and comprises a wheel spindle 7 threaded at both ends, a wheel hub 9 rotatably supported on the spindle 7 and axially retained between retaining nuts 8 screwed on the spindle 7, a wheel rim 11, and wire spokes 10 threaded through holes in side flanges of the hub 9 and extending at an angle inwardly to the rim 11 where they pass through holes in the center plane of the rim. The spokes 6 are threaded at their outer ends and are engaged by threaded spoke nipples 12 inserted through these rim holes. By turning these nipples in the one or the other direction the tension of the spokes 6 can be increased or decreased for properly truing the wheel. In this truing or centering operation lateral irregularities or radial errors of the wheel rim must be detected as they occur along the circumference of the rim and then be corrected by tightening or slackening the spokes adjacent the location of the detected error. The present apparatus serves for detecting flat errors of a spoke wheel to be centered.

Figure 1:
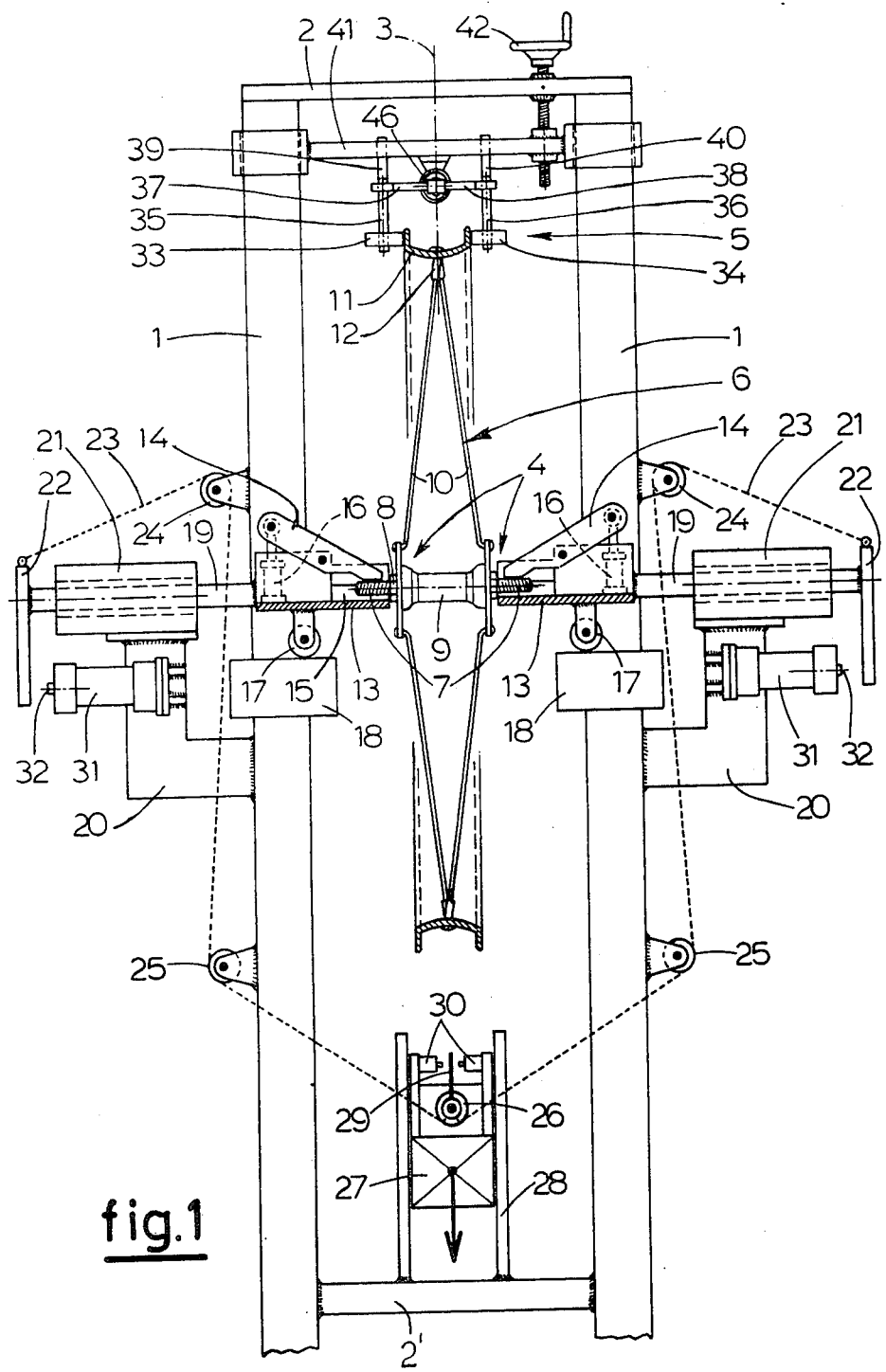
FIG. 1 shows an elevation and partly a vertical section of an embodiment of the apparatus for detecting lateral irregularities of the rim of a wire spoke wheel according to the invention in which parts not essential for a proper understanding of the invention have been left out.

The wheel spindle holding means 4 comprises two spindle clamping mechanisms arranged on both sides of the reference plane 3 and each including a lower clamping jaw 13 and an upper clamping jaw 14 pivotally secured thereto. The lower jaw 13 forms a V-shaped recess which is open on the side of the reference plane 3 and is adapted to receive one end of the wheel spindle 7. One side-wall of the recess of each jaw 13 has a greater height than the other side-wall (not shown in the drawing) to facilitate the placing of the wheel spindle ends in the jaw 13. Each upper clamping jaw 14 has its outward end pivotally connected to the piston rod of a piston movable in an air cylinder 16 supported on the associated lower jaw 13. The upper clamping jaws 14 can thus be opened and closed by pressurizing the cylinders 16 in the one or the other direction in a known manner. The inwardly turned ends of the upper jaws 14 extend into the V-shaped recesses of the lower jaws 13 in the closed position of the clamping mechanisms so as to clampingly engage the wheel spindle ends placed in these recesses, as shown in FIG. 1.

The lower clamping jaws 13 are supported by means of rollers 17 on horizontal guide rails 18 secured to the frame beams 1, the jaws 13 thus being movable in an axial direction perpendicular to the plane of reference 3. Each clamping jaw 13 has a guide-rod 19 secured at its outer end and extending outwardly therefrom through a guide bushing 21. The bushings 21 are aligned with respect to each other and are supported by brackets 20 secured to the beams 1. The two clamping jaws 13 are thus movable transversely of the reference plane 3 independently of one another.

The outward ends of the rods 19 projecting from the bushings 21 each have a vertically extending arm 22 secured thereto. A flexible cable 23 is secured with its ends to the upper ends of the arms 22 and, from each arm, extends first inwardly and then downwardly around guide rollers 24 and 25 secured to the frame beams 1, the cable thus forming a loop passing around an idle roller 26 at its lower end. The roller 26 is mounted on a weight block 27 which is guided for free vertical movements in slides 28 supported on the cross-beam 2' of the frame. The course of the cable 23 from the arms 22 to the roller 26 has only been schematically indicated in FIG. 1 but it will be clear that the weight block 27 keeps the cable 23 tensioned and thus draws the clamping jaws 13 towards one another with a constant force independently of the relative position of these jaws and without in any way restricting or impeding a joint movement of these jaws in the same lateral direction. If, therefore, in the open position of the upper clamping jaws 14 a spoke wheel is placed with its spindle 7 in the lower clamping jaws 13, these jaws are drawn toward each other until their end faces abut the hub retaining nuts 18 whereupon the upper jaws 14 can be closed to clampingly engage the wheel spindle ends. The two clamping mechanisms are then joined together and can jointly move in the one or the other lateral direction which movement is translated into an angular movement of the idle roller 26 which is so carried out as to engage the cable 23 without slipping. The roller 26 carries an upwardly extending switch arm 29 arranged between and cooperating with two microswitches 30 arranged on the weight block 27. On an angular displacement of the idle roller 26 in the one or the other direction the switch arm 29 will thus actuate one of the microswitches 30.

Each of the clamping mechanisms 13, 14 has an associated drive means for moving the clamping mechanisms outwardly against the inwardly directed force of the cable 23. This drive means comprises, for each of the clamping mechanisms an air cylinder 31 secured to the one or the other of the brackets 20 and extending below the correspondingly guide bushing 21. The piston movable in this air cylinder carries a push-rod 32. In their retracted positions of FIG. 1 these push-rods 32 are sufficiently spaced from the arms 22 to allow the lateral movement of the two clamping mechanisms 13, 14 necessary for detecting flat errors of the wheel 6. However, by suitable simultaneous activation of both air cylinders 31 these push-rods 32 can be moved outwardly to a first position in which they engage the arms 22 and move the clamping mechanisms 13, 14 to a first spaced inoperative position in which the distance between the inner ends of the jaws 13 is greater than the distance between the wheel nuts 8 but smaller than the length of the wheel spindle 7. In the open position of the upper jaws 14, a wheel to be treated can then be advanced along a feed channel or the like (not shown), the end parts of the spindle 7 moving over the above-mentioned lower side-walls of the jaws recesses 15 and being stopped by the other, higher recess side-walls so as to drop into the recesses. The push-rods 32 are then again retracted allowing the weight block 27 and cable 23 to draw the jaws 13 inwardly against the wheel nuts 8, whereupon by the actuation of the air cylinders 16 the upper clamping jaws 14 are closed to secure the wheel spindle ends in this position.

By a suitable activation of the air cylinders 31 it is possible to move the push-rods 32 further outwardly to a second inoperative spaced position in which the distance between the inner ends of the jaws 13 is greater than the length of the wheel spindle 7, whereby the wheel is dropped from the apparatus onto a suitable delivery device or the like (not shown). It follows from the foregoing that the wheel spindle holding means can receive and clampingly hold wheels of varying spindle diameters and varying hub lengths.

Figure 2:
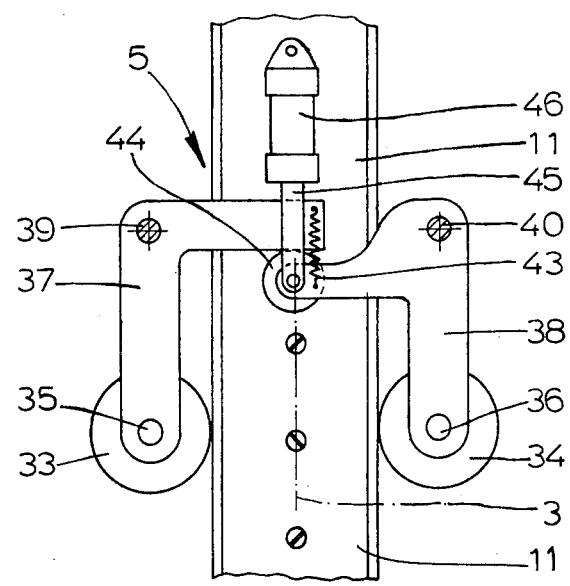
FIG. 2 is a plan view of the wheel rim retaining means of the apparatus of FIG. 1.

The wheel rim retaining means 5 comprises two follower rollers 33 and 34 (see also FIG. 2) arranged symmetrically on both sides of the plane of reference 3. The rollers 33 and 34 are mounted for free rotation at the lower ends of vertically upwardly extending shafts 35, 36 which at their upper ends are supported in L-shaped levers 37 and 38, respectively. These levers are pivotally mounted on the lower ends of vertically extending pivot pins 39, 40, respectively, which pivot pins are secured at their upper ends in a support plate 41. This support plate 41 is vertically slideable on the frame supports 1 and can be vertically adjusted by means of a screw spindle and hand wheel 42 in the manner as shown in FIG. 1 whereby the vertical position of the retaining means 5 can be adapted to the radius of the wheel 6. The short arms of the two L-shaped levers 37 and 38 extend inwardly towards each other and partly overlap, the inner ends of these arms being connected by a draw spring 43 which holds the inner end of the lever 37 pressed against a roller 44 on the inner end of the lever 38. An air cylinder 46 supported by the support plate 41 has a piston rod 45 connected to the shaft of the roller 44. The piston movable in the air cylinder 46 is biased by a spring in said cylinder (not shown) tending to retract the piston rod 45 and thus to hold the follower rollers 33 and 34 tightly pressed against the side-edges of the wheel rim 11 so as to prevent lateral movement thereof. By proper actuation of the air cylinder 46, however, the piston rod 45 can be moved outwardly to spread the follower rollers 33 and 34 when a spoke wheel 6 is set in the apparatus or is removed therefrom. The above-described lever arrangements allow wheel rims of varying widths to be clamped between the follower rollers 33 and 34 and also allow these rollers to adjust themselves to variations in the width of the rim itself when the wheel is rotated, whereby the rim is at all times firmly held between the follower rollers 33 and 34 in a lateral position in which the center of the rim part located between these rollers coincides with the reference plane 3 of the apparatus.

It will be clear that after the spoke wheel 6 has been mounted in the wheel spindle holding means 4 in the manner as above described and after the closing of the wheel rim retaining means 5 on the wheel rim 11, the two clamping mechanisms 13, 14 will assume an out-of-center position with respect to the plane of reference 3 depending on the value and direction of the flat error occurring at the location of the wheel rim 11 where the follower rollers 33, 34 engage the same. By a step-wise rotation of the wheel 6 it is thus possible to determine the flat errors in subsequent points along the circumference of the wheel.

The lateral displacements of the clamping mechanisms 13, 14 are transmitted by the cable 23 to the roller 26 which thus rotates the arm 29 to the left or the right from its midposition. The switch arm 29 thereby actuates the one or the other of the microswitches 30 as long as the flat error is not corrected. By adjusting the spacing between the microswitches 30 it is possible to choose the range within which a small remaining flat error is acceptable. If a reading of the amount of flat errors is desired it is possible to provide a pointer on the roller 26 or on the wheel spindle holding means 4 together with a suitable scale for this pointer.

It will be obvious that within the scope of the present invention other known and suitable means can be employed for determining and signalling out-of-center displacements of the wheel spindle holding means 4 with respect to the reference plane 3.

The apparatus as above described can be used for manually truing spoke wheels but is in particular suitable and intended to form part of a machine for automatically centering spoke wheels of the type as disclosed in the above-mentioned Netherlands patent application No. 74.12490. In that case, as there shown, two nipple turning units can be supported on the support plate 41 on both sides of the reference plane 3 and adapted to simultaneously engage the nipples of two adjacent spokes of the wheel to turn the same in the one or the other direction under the control of signals from the microswitches 30 as regards a flat error to be corrected. As further shown in said Netherlands patent application a radial error detecting means can likewise be supported on the support plate 41 for controlling the nipple turning units in the correction of radial errors. The wheel 6 can be stepwise rotated for instance by means of an electric motor coupled to one of the follower rollers 33 and 34. Since these parts are fully disclosed in said Netherland patent application and are, as such, not required for a proper understanding of the present invention, they will not be further described here. It will be clear, however, that any lateral forces which may occur when nipple turning tools are applied to the spoke nipples 12, will substantially be taken up by the follower rollers 33 and 34 and cannot influence the transverse position of the wheel rim 9 nor the value of the flat error as measured at the point of the wheel rim circumference where the follower rollers engage the latter.

Although the invention has been described with reference to an embodiment thereof, other embodiments may be resorted to within the scope of the following claims.

What is claimed is:

1. An apparatus for detecting lateral irregularities of the rim of a wire spoke wheel, in particular for use in a machine for centering such spoke wheels, said wheel including a wheel spindle, a hub rotatably mounted on said spindle in an axially fixed position, a wheel rim and a plurality of lengthwise adjustable spokes extending between said hub and rim, comprising a frame;

spindle holding means adapted to receive and fixedly hold said wheel spindle, said holding means being mounted in said frame for free longitudinal sliding movement in the axial direction of the wheel spindle held therein;

wheel rim retaining means on said frame comprising two oppositely arranged rim follower means adapted to engage said wheel rim on both sides thereof at one point of its circumference so as to hold said rim in a fixed lateral position at said point while allowing said wheel rim to be rotated about said spindle, said two follower means determining a fixed plane of reference extending midway therebetween perpendicular to said direction of movement of said spindle holding means; and means for detecting lateral displacement of said spindle holding means with respect to said plane of reference.

2. The apparatus of claim 1 in which said spindle holding means comprises two spindle clamping mechanisms oppositely arranged on both sides of said reference plane and each adapted to clampingly hold one end of said wheel spindle, each of said clamping mechanisms being supported in said frame for axial movement independently of the other, tensioning means acting between said two clamping mechanisms to draw the same towards one another without restricting their free joint movability in the same axial direction, operating means for opening and closing said clamping mechanisms, and drive means adapted to engage said clamping mechanisms to move the same outwardly away from one another against the action of said tensioning means to at least one pre-determined spaced position allowing the placing of a wheel spindle in said clamping mechanisms and the removal thereof from said mechanisms, respectively, in the open position of the latter.

3. The apparatus of claim 2 in which said drive means comprise two pressure fluid operated drive cylinders, one for each of said clamping mechanisms, and control means for simultaneously actuating said drive cylinders.

4. The apparatus of claim 3 further comprising aligned guide rods, one secured to each of said clamping mechanisms and extending axially outwardly therefrom, guide means on said frame slideably receiving said guide rods, a transverse operating arm secured to each of said guide rods, and two push rods each operated by one of said drive cylinders and each co-operating with the operating arm of one of said guide rods to engage and move the latter outwardly on the actuation of said drive cylinders.

5. The apparatus of claim 2 in which said tensioning means comprises an elongated flexible pulling element having two ends secured to the one and the other of said clamping mechanisms, respectively, drawing means co-operating with said flexible member, and guide rollers for said flexible member guiding the latter inwardly from said respective clamping mechanisms towards said drawing means to allow the latter to exert, through said flexible element, an inwardly directed force on each of said two clamping mechanisms.

6. The apparatus of claim 5 in which said drawing means comprises a weight member vertically slideable in said frame, and an idler roller rotatably secured to said weight member, said flexible element passing around said idle roller to support said weight member.

7. The apparatus of claim 6 in which said detecting means comprises an arm secured to said idle roller to move therewith and indicator means responsive to angular movement of said arm a predetermined distance in either direction from a mid-position thereof corresponding to a perfectly aligned rim.

8. The apparatus of claim 7 in which said indicator means comprises two electrical switch means arranged on both sides of and spaced from said arm in the mid-position of the latter.

* * * * *